(12) United States Patent
Chiu et al.

(10) Patent No.: US 7,886,179 B2
(45) Date of Patent: Feb. 8, 2011

(54) METHOD FOR ADJUSTING WORKING FREQUENCY OF CHIP

(75) Inventors: Kao-Yi Chiu, Taipei (TW); Yu-Hsuan Lai, Taipei (TW); Chien-Hua Ting, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 640 days.

(21) Appl. No.: 11/958,387

(22) Filed: Dec. 18, 2007

(65) Prior Publication Data

US 2008/0148090 A1  Jun. 19, 2008

Related U.S. Application Data

(60) Provisional application No. 60/870,603, filed on Dec. 18, 2006.

(51) Int. Cl.
*G06F 1/08* (2006.01)
(52) U.S. Cl. ............... 713/600; 713/400; 713/401; 713/500; 713/501; 713/502; 713/503; 713/601
(58) Field of Classification Search ......... 713/400–401, 713/500–503, 600–601
See application file for complete search history.

(56) References Cited

U.S. PATENT DOCUMENTS

| | | | | |
|---|---|---|---|---|
| 6,633,648 | B1 * | 10/2003 | Bauck | 381/303 |
| 7,552,353 | B2 * | 6/2009 | Ho et al. | 713/600 |
| 7,626,637 | B2 * | 12/2009 | Chiu et al. | 348/559 |
| 2005/0262451 | A1 * | 11/2005 | Remignanti et al. | 715/833 |
| 2006/0020356 | A1 * | 1/2006 | Kano | 700/94 |

* cited by examiner

*Primary Examiner*—Abdelmoniem Elamin
(74) *Attorney, Agent, or Firm*—Jianq Chyun IP Office

(57) ABSTRACT

A method for adjusting the working frequency of a chip is provided. The method detects a frequency adjustment range of a graphic chip when a system is booted. Then, an application program in full screen mode is executed, and a control hot key is enabled. Afterwards, an input of the control hot key is received to display a user interface. Finally, an input frequency inputted from the user interface is received, and the working frequency of the graphic chip is adjusted according to the input frequency in the frequency adjustment range. Therefore, even though the application program is executed in full screen mode, the working frequency of the graphic chip can still be adjusted according to requirements in any time, which is convenient for the user.

14 Claims, 3 Drawing Sheets

METHOD FOR ADJUSTING WORKING FREQUENCY OF CHIP

CROSS-REFERENCE TO RELATED APPLICATION

This application claims the priority benefit of U.S. provisional application Ser. No. 60/870,603, filed on Dec. 18, 2006. The entirety of the above-mentioned patent application is hereby incorporated by reference herein and made a part of this specification.

BACKGROUND OF THE INVENTION

1. Field of the Invention

The invention relates to a method for adjusting the working frequency of a chip and, more particularly, to a method for adjusting the working frequency of a graphic chip in an application program in a full screen mode.

2. Description of the Related Art

Not only the operation performance of the computer system needs to be improved, obtaining the rapid graphic function also is an objective. With the development of the science and technology, the graphic technology such as 3D graphic which needs a great deal of data has been used more and more widely, and the 3D graphic software or 3D game software on the market are also innovated quickly, and data used by the graphic technology thereof become more and more. Therefore, in the same set of hardware device, for some 3D software, the efficiency of the hardware is easy to be insufficient, which causes that the software cannot be executed or the software cannot be executed fluently. When the efficiency of the hardware is insufficient, to save the expense, users choose to adjust the clock of the hardware, namely, commonly called overclock without changing the hardware device to increase the working efficiency of the hardware.

Besides the central processing unit (CPU), the graphic chip also can be overclocked. Generally speaking, when users play 3D games with a great deal of data, if the processing speed of the graphic chip is not fast enough, the situation that the frame fluency may not be preferred may occur when the game is played. Therefore, before playing the 3D game, many users start the overclock program to set the number which is to be overclocked first, and then they start the game, so that the working efficiency of the graphic chip can be improved when the game is played. If users want to make an overclock again after they enter the game, they have to exit the game to execute the overclock program to set again, and then they enter the game after the setting. If the fluency is still not preferred after the game is entered again, and users want to make an overclock again, they have to repeat the above steps. These complex actions make it inconvenient for users to use.

BRIEF SUMMARY OF THE INVENTION

The invention provides a method for adjusting the working frequency of a chip, and users can adjust the working frequency of a graphic chip at any time according to their need in an application program in a full screen mode by the method.

The invention provides a method for adjusting the working frequency of a chip, and the method is suitable to be used to adjust the working frequency of a graphic chip when an application program is executed in a full screen mode. The method for adjusting the working frequency of a chip includes the following steps. A frequency adjustment range of a graphic chip is detected when a system is booted. The application program is executed in a full screen mode and the control hot key is enabled. The input of a control hot key is received to display a user interface. At last, an input frequency inputted from the user interface is received, and the working frequency of the graphic chip is adjusted in the frequency adjustment range according to the received input frequency.

In one embodiment of the invention, the step of detecting the frequency adjustment range of the graphic chip is executed by adjusting the working frequency of the graphic chip step by step from the preset working frequency at first. Then, the step of detecting whether the graphic chip is abnormal is executed. At last, if the graphic chip becomes abnormal, the step of adjusting the working frequency of the graphic chip is stopped, and the working frequency of the graphic chip after the present adjustment is an ultimate value of the frequency adjustment range.

In one embodiment of the invention, the step of detecting whether the graphic chip is abnormal is executed by operating the graphic chip with the working frequency after the adjustment of the graphic chip and detecting the temperature of the graphic chip in operating. Then, whether the temperature of the graphic chip in operating is higher than the preset temperature is determined. At last, when the temperature of the graphic chip in operating is higher than the preset temperature, it indicates that the graphic chip is abnormal.

In one embodiment of the invention, the step of starting the application program in a full screen mode further includes the step of loading a dynamic link library (DLL). After the DLL is loaded, the step of calling the DLL is further included, and the working frequency of the graphic chip is adjusted according to the input frequency.

In the embodiment of the invention, the step of displaying the user interface is making the user interface embedded into the next frame which will be displayed by the application program in a full screen mode.

In one embodiment of the invention, after the frequency adjustment range of the graphic chip is detected, the frequency adjustment range is further recorded in the basic input out system (BIOS). The frequency adjustment range is further loaded from the BIOS.

In the invention, when the system is booted, the frequency adjustment range of the graphic chip is detected to adjust the working frequency of the graphic chip in the application program in a full screen mode. Therefore, the working frequency of the graphic chip can be adjusted according to the need of the users at any time, and no matter what state the system is in, users can adjust the working frequency of the chip, which is very convenient.

These and other features, aspects, and advantages of the present invention will become better understood with regard to the following description, appended claims, and accompanying drawings.

DETAILED DESCRIPTION OF THE EMBODIMENTS

Generally speaking, when an application program (such as a game program) is executed in a full screen mode, if the speed is slow and the efficiency is not preferred, and the working frequency of the chip needs to be adjusted, users have to exit the frame in a full screen mode and use related application program to adjust. In the invention, users can adjust the working frequency of the graphic chip at any time by starting a user interface via a control hot key when an application program is executed in a full screen mode. To make the content of the invention clearer, the following embodiment is provided to be the example of the invention.

The graphic chip in the following embodiment is, for example, a graphic process unit (GPU), and the application program in a full screen mode is, for example, a game program. People having ordinary skills in the art can apply the embodiment of the invention to various kinds according to their need.

Figure 1:
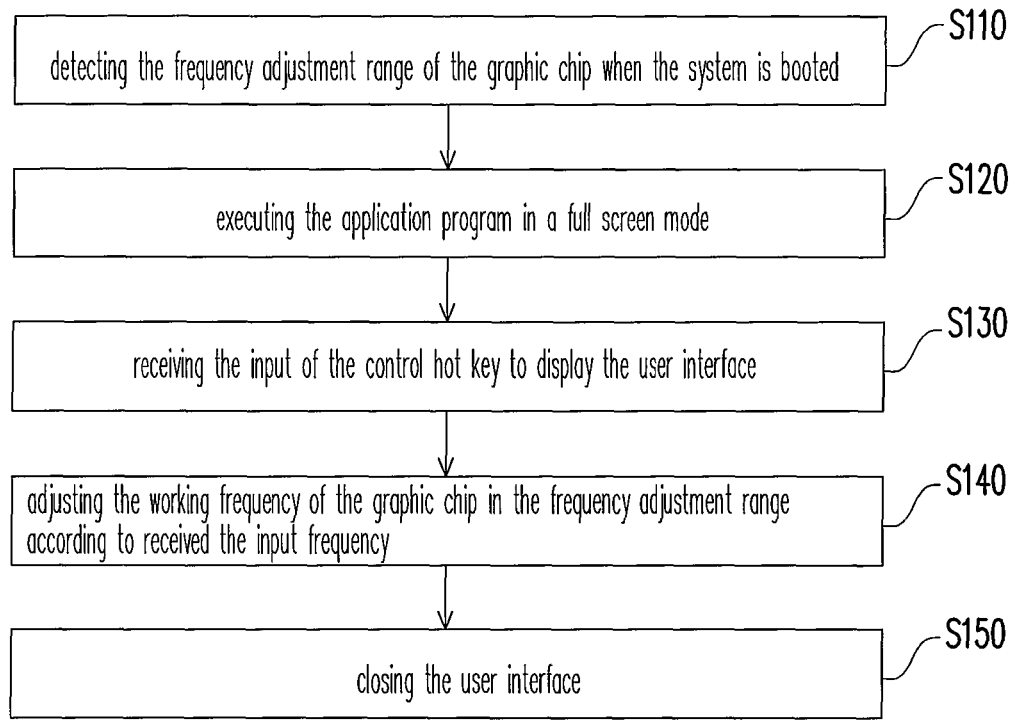
FIG. 1 is a flowchart showing a method for adjusting the working frequency of a chip according to an embodiment of the invention.

FIG. 1 is a flowchart showing a method for adjusting the working frequency of a chip in an embodiment of the invention. Please refer to FIG. 1. First, in the step S110, when the system is booted, the frequency adjustment range of the graphic chip is detected dynamically. That is, the greatest ultimate value to which the graphic chip can be overclocked is detected to avoid the situation that the working frequency is adjusted over-high carelessly when the working frequency of the chip is adjusted, which will cause the graphic chip to be damaged. When the detection is finished, the system records the detected frequency adjustment range in the basic input output system (BIOS) in the memory.

In addition, before the frequency adjustment range of the graphic chip is detected, whether the hardware device of the system and the outside environment are changed can be determined first to determine whether to continue to use the frequency adjustment range which is detected last time. If they are not changed, the frequency adjustment range which is detected last time is used again to accelerate the speed of the boot of computer, which can be used according to the need of the users and is not limited in the invention.

Figure 2:
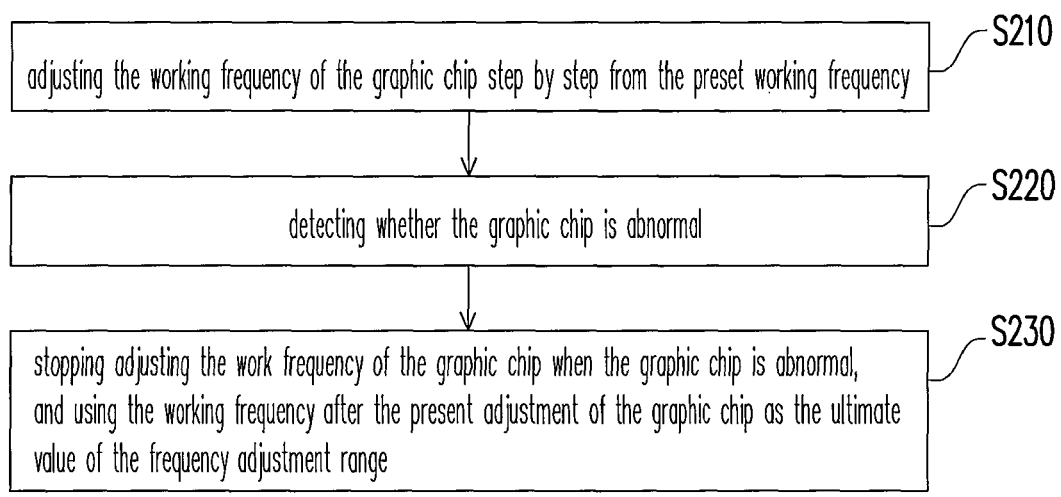
FIG. 2 is a flowchart showing a method for detecting the frequency adjustment range of a graphic chip according to an embodiment of the invention.

The step of detecting the frequency adjustment range of the graphic chip can be divided into a plurality of sub-steps. FIG. 2 is flowchart showing the method for detecting the frequency adjustment range of the graphic chip according to an embodiment of the invention. Please refer to FIG. 2. The step S210 is automatically adjusting the working frequency of the graphic chip step by step from the preset working frequency. In other words, that is, when the system is booted, taking a preset working frequency as the standard, and the working frequency of the graphic chip is adjusted upward step by step. The adjusting manner is, for example, increasing the working frequency by a certain percentage, or increasing a certain fixed value slowly. The preset working frequency is, for example, the working frequency which is initially set when the graphic chip leaves the factory. Under the initial working frequency, the system can operate in a most stable state.

Please go on referring to FIG. 2. After the working frequency of the graphic chip is adjusted, the step S220 is detecting whether the graphic chip is abnormal to determine whether to continue detecting the frequency adjustment range of the graphic chip. For example, the operation temperature can be used to determine whether the graphic chip is abnormal. The adjusted working frequency of the graphic chip is utilized to operate, and the temperature of the graphic chip in operating is detected to determine whether the temperature of the graphic chip in operating is higher than the preset temperature. If the temperature of the graphic chip in operating is higher than the preset temperature, it indicates that the graphic chip is abnormal.

The step S230 is stopping adjusting the working frequency of the graphic chip when the graphic chip is abnormal, and the working frequency after the present adjustment of the graphic chip is used to be the ultimate value of the frequency adjustment range. That is, if the working frequency of the graphic chip is unceasingly adjusted, the operation of the system becomes more unstable. For example, the voltage becomes unstable. Therefore, the working frequency after the present adjustment of the graphic chip is set to be the greatest value of the frequency adjustment range.

For example, if the preset working frequency of the graphic chip is 500 MHz (500 million Hz, that is, the operation speed is 500 million per second), when the frequency adjustment range is detected, the adjustment is done from 500 MHz and upward by a range each time. For example, when the frequency is adjusted by 5 MHz each time, the working frequency of the graphic chip is adjusted in sequence to be 505 MHz, 510 MHz, 515 MHz . . . , and it is not adjusted until the abnormality is detected. If the temperature of the graphic chip in operating is detected to be over-high when the working frequency is 600 MHz, 600 MHz is the ultimate value of the frequency adjustment range. In other word, the highest working frequency can be 600 MHz.

Please go on to refer to FIG. 1. The step S120 is executing the application program in a full screen mode and enabling the control hot key by the system simultaneously. After the application program in a full screen mode is executed, the system loads the dynamical link library (DLL) which adjusts the working frequency of the chip to the memory to provide the subsequent action to call and use.

The step S310 is receiving the input of the control hot key in the application program in a full screen mode to display the user interface. In other word, when the system detects that the control hot key is pressed, the user interface is displayed. The action of displaying the user interface is making the user interface embedded into the next frame which will be shown by the application program in a full screen mode.

Figure 3:
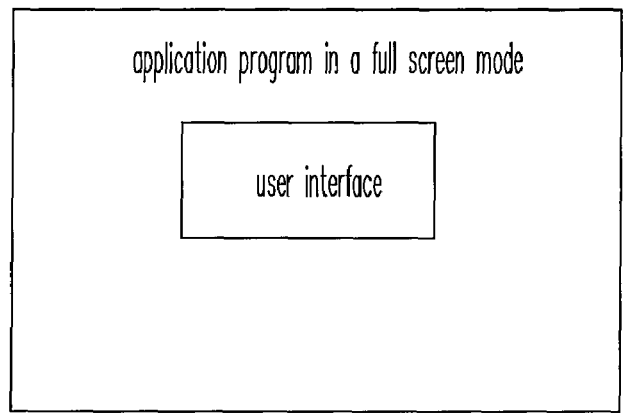
FIG. 3 is a schematic diagram showing the user interface which is displayed according to an embodiment of the invention.

For example, FIG. 3 is a schematic diagram showing the user interface which is shown according to an embodiment of the invention. Please refer to FIG. 3. When the system receives the input of the control hot key, it utilizes some command to display the user interface and add the user interface to the next frame which will be shown. For example, coordinate commands can be added to the next frame which will shown and are used as the position where the user interface is shown in the full screen mode to show the user interface.

Please go on referring to FIG. 1. The displayed user interface in the step S130 includes the frequency adjustment range. That is, when the user interface is displayed, the system loads the frequency adjustment range detected in the step S110 of the graphic chip from the BIOS and displays the frequency adjustment range in the user interface, and it also can display the present working frequency of the display chip in the user interface. Therefore, users also can set the working frequency which is to be adjusted according to the frequency adjustment range. However, the above is used for making it convenient to describe, and the kind of the data in the user interface is not limited in the embodiment.

The step S140 is adjusting the working frequency of the graphic chip in the frequency adjustment range according to the received input frequency. That is, users can set the input frequency (namely, the working frequency which is to be adjusted) according to their need, and system adjusts the working frequency of the graphic chip according to the input frequency. If the input frequency is not within the frequency adjustment range, the system adjusts the working frequency of the graphic chip to, for example, the greatest value of the frequency adjustment range, and it does not adjust the working frequency to be the input frequency inputted by the users forcibly to ensure the stability of the system. In addition, after the input frequency is received, the system calls the DLL which adjusts the working frequency of the chip from the memory and adjusts the working frequency of the graphic chip according to the input frequency.

At last, after the working frequency of the graphic chip has been adjusted, the user interface is closed. The method for closing the user interface is, for example, pressing the control hot key again to close the user interface or using the cursor on the user interface to select the close key and so on.

After the working frequency of the graphic chip has been adjusted, in the application program in a full screen mode, if the working frequency is adjusted to be over-high, and the system is overburdened, the pattern may be destroyed. On the other hand, if the working frequency is adjusted to be insufficient, the frame fluency is not preferred. Therefore, the control hot key can be pressed again to display the user interface to increase or decrease the working frequency of the graphic chip. The number of times for adjusting the working frequency of the graphic chip can be adjusted according to the operation situation of the system by users.

Figure 4A:
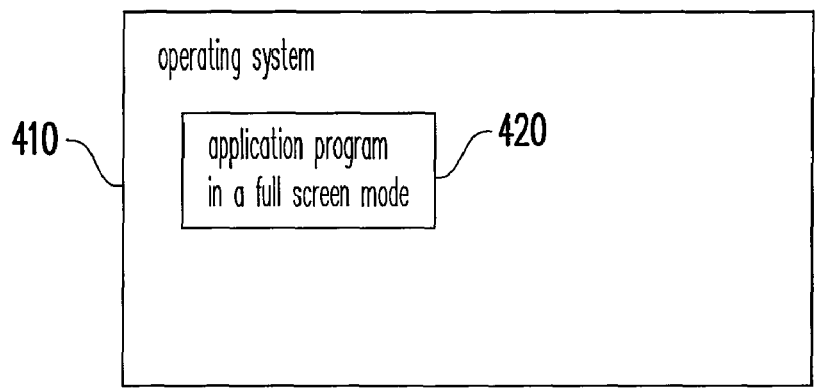
FIG. 4A to FIG. 4C are schematic diagrams showing that the user interface is utilized to adjust the working frequency of the chip according to an embodiment of the invention.
Figure 4A:
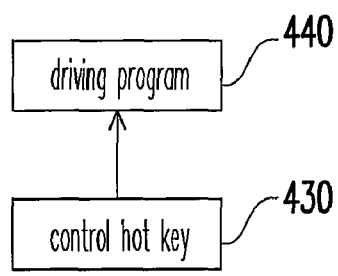
Figure 4B:
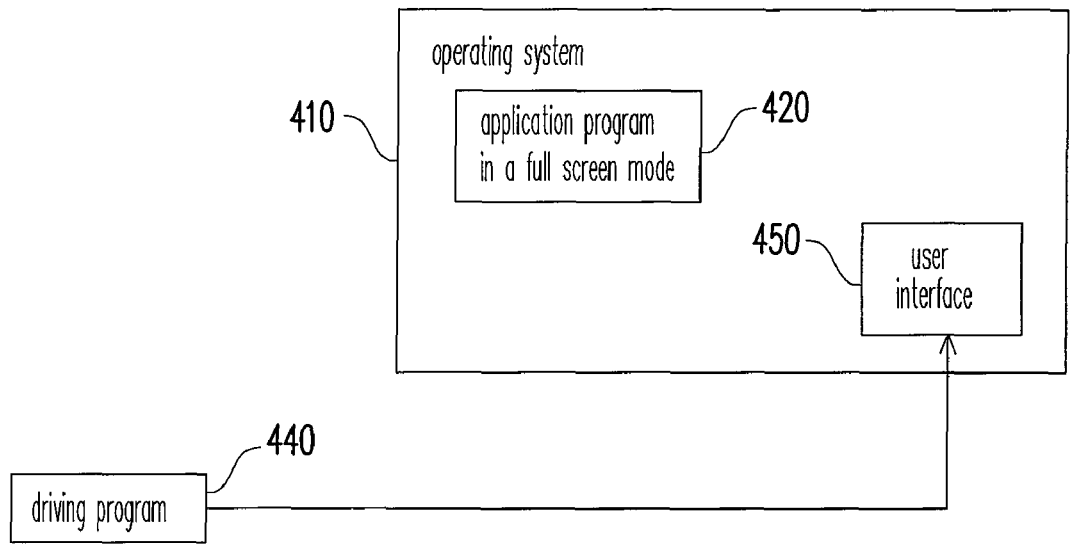
Figure 4C:
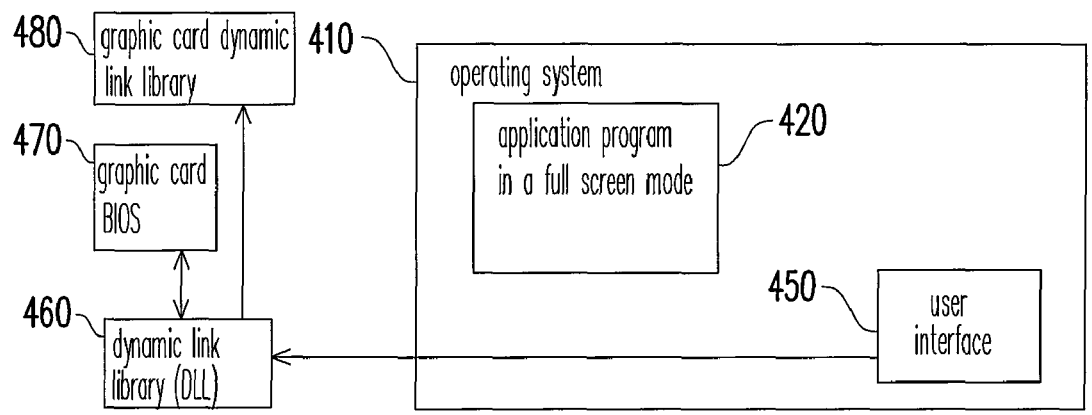

To make the above concept clear, another embodiment is provided. FIG. 4A to FIG. 4C are schematic diagrams showing that the user interface is utilized to adjust the working frequency of a chip according to an embodiment of the invention. Please refer to FIG. 4A. When the application program 420 is executed in a full screen mode in the operating system 410, if the operating system 410 receives the input from the control hot key 430 by the users, the control hot key 430 calls the driving program 440 (driver). Then, please refer to FIG. 4B. The driving program 440 starts the user interface 450 in the operating system 410 and makes the user interface 450 embedded into the application program 420 in a full screen mode (as shown in FIG. 3).

Then, please refer to FIG. 4C. After the user interface 450 is started, users can set the input frequency on the user interface 450. After the setting is finished, the user interface 450 transmits the received input frequency to the DLL 460. The DLL 460 adjusts the working frequency (that is, the overclock is executed) of the graphic chip according to the input frequency and the frequency adjustment range in the graphic card BIOS 470. Then, the graphic card DLL 480 continues displaying the frame. The graphic card DLL 480 is, for example, the driving program of the graphic card and drives the graphic card according to the working frequency adjusted by the DLL 460 to go on displaying the application program in a full screen mode.

To sum up, the method for adjusting the working frequency of a chip which is provided in the invention has at least the following advantages.

First, the frequency adjustment range is detected once the system is booted, and the working frequency of the graphic chip is adjusted in the frequency adjustment range, and therefore, the graphic chip can avoid being damaged because of the overclock.

Second, in the application program in a full screen mode, a control hot key is used to start the user interface and choose to adjust the working frequency of the graphic chip, which improve the convenience in use.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A method for adjusting the working frequency of a chip which is suitable to adjust the working frequency of a graphic chip when an application program is executed in a full screen mode, the method for adjusting the working frequency of a chip comprising the steps of:
   detecting a frequency adjustment range of the graphic chip when the system is booted;
   executing the application program in a full screen mode and enabling a control hot key;
   receiving the input of the control hot key to display a user interface; and
   receiving an input frequency inputted from the user interface and adjusting the working frequency of the graphic chip in the frequency adjustment range according to the input frequency which is received.

2. The method for adjusting the working frequency of a chip according to claim 1, wherein the step of detecting the frequency adjustment range of the graphic chip comprises the steps of:
   adjusting the working frequency of the graphic chip step by step from a preset working frequency;
   detecting whether the graphic chip is abnormal; and
   stopping adjusting the working frequency of the graphic chip when the graphic chip is abnormal, and using the working frequency of the graphic chip after the present adjustment as the ultimate value of the frequency adjustment range.

3. The method for adjusting the working frequency of a chip according to claim 2, wherein the step of detecting whether the graphic chip is abnormal comprises the steps of:
   operating the graphic chip by the working frequency of the graphic chip after the adjustment and detecting the temperature of the graphic chip in operating;
   determining whether the temperature of the graphic chip in operating is higher than a preset temperature; and
   when the temperature of the graphic chip in operating is higher than the preset temperature, it indicates that the graphic chip is abnormal.

4. The method for adjusting the working frequency of a chip according to claim 2, wherein the preset working frequency is the working frequency which is set initially when the graphic chip leaves the factory.

5. The method for adjusting the working frequency of a chip according to claim 1, wherein the step of starting the application program in a full screen mode further comprises the step of:
   loading a dynamic link library (DLL).

6. The method for adjusting the working frequency of a chip according to claim 5, wherein the step of loading the dynamic link library (DLL) further comprises the step of:
   calling the dynamic link library to adjust the working frequency of the graphic chip according to the input frequency.

7. The method for adjusting the working frequency of a chip according to claim 1, wherein the step of displaying the user interface comprises the step of:
   embedding the user interface into the next frame that is displayed by the application program in a full screen mode.

8. The method for adjusting the working frequency of a chip according to claim 1, wherein the step of detecting the frequency adjustment range of the graphic chip further comprises the step of:
  recording the frequency adjustment range at a basic input output system (BIOS).

9. The method for adjusting the working frequency of a chip according to claim 8, wherein the step of recording the frequency adjustment range at the basic input output system (BIOS) further comprises the step of:
  loading the frequency adjustment range from the basic input output system (BIOS).

10. The method for adjusting the working frequency of a chip according to claim 8, wherein the basic input output system is stored in a memory.

11. The method for adjusting the working frequency of a chip according to claim 1, wherein the user interface comprises the frequency adjustment range.

12. The method for adjusting the working frequency of a chip according to claim 1, further comprising the step of:
  closing the user interface.

13. The method for adjusting the working frequency of a chip according to claim 1, wherein the graphic chip comprises a graphic process unit (GPU).

14. The method for adjusting the working frequency according to claim 1, wherein the application program in a full screen mode comprises a game program.

* * * * *